J. E. THORNTON & H. KUHN.
APPARATUS FOR MAKING PHOTOGRAPHIC FILMS.
APPLICATION FILED JULY 28, 1910.

1,116,762.

Patented Nov. 10, 1914.

4 SHEETS—SHEET 1.

Witnesses:
Clarence W. Carroll
L. Thon

Inventors
John Edward Thornton and
Henry Kuhn
by Osgood Davis Doury
their attorneys J. E. THORNTON & H. KUHN.
APPARATUS FOR MAKING PHOTOGRAPHIC FILMS.
APPLICATION FILED JULY 28, 1910.
1,116,762.
Patented Nov. 10, 1914.
4 SHEETS—SHEET 2.
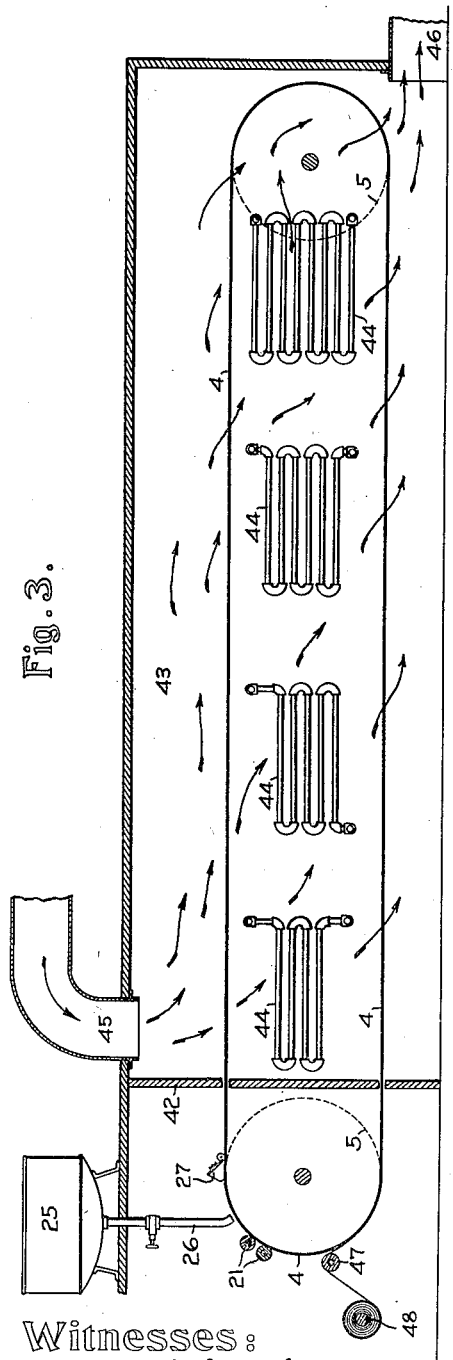
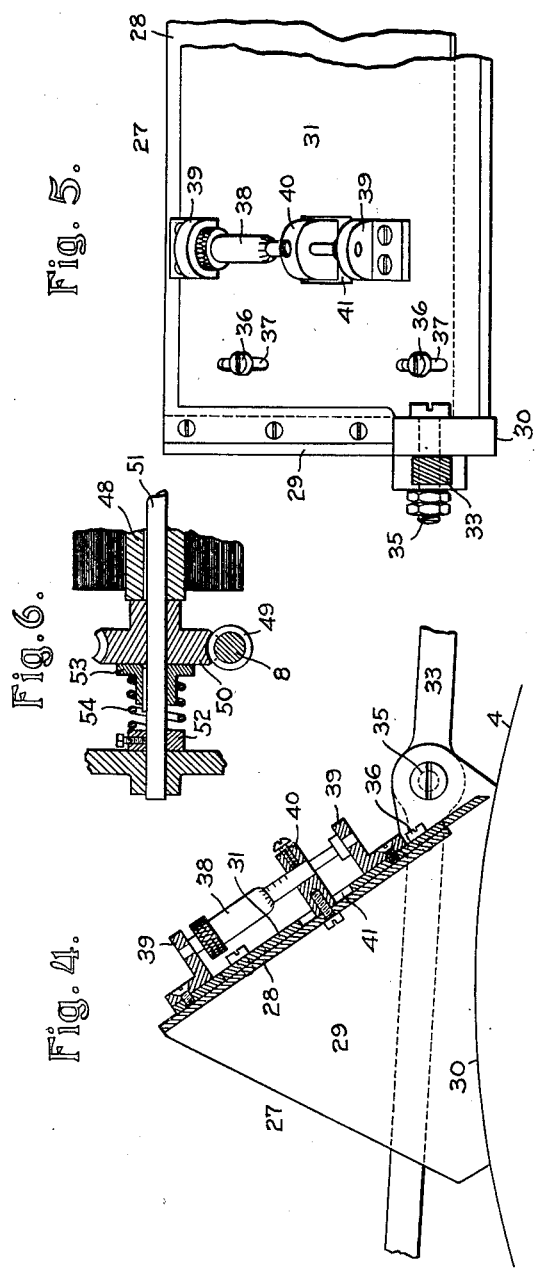

J. E. THORNTON & H. KUHN.
APPARATUS FOR MAKING PHOTOGRAPHIC FILMS.
APPLICATION FILED JULY 28, 1910.

1,116,762.

Patented Nov. 10, 1914.
4 SHEETS—SHEET 3.

Witnesses:
Clarence W. Carroll
L. Thon

Inventor:
John Edward Thornton
and Henry Kuhn
by Osgood Davis & Dorsey
their attorneys

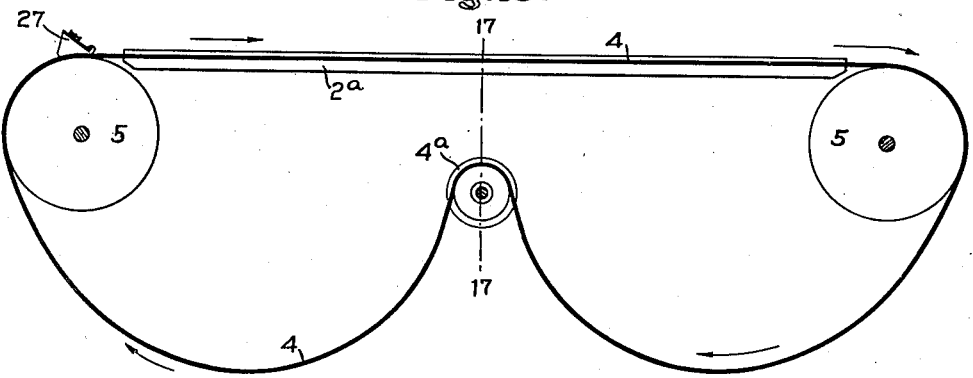
Fig. 15.
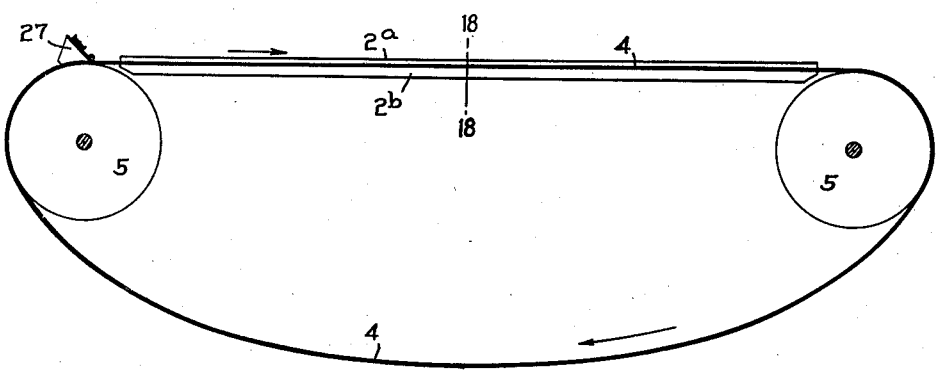
Fig. 16.
Fig. 17.
Fig. 18.
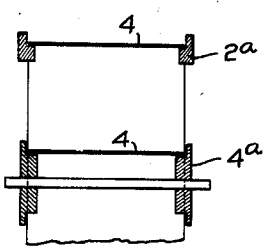
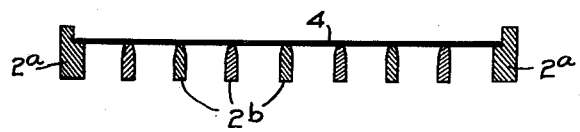

UNITED STATES PATENT OFFICE.

JOHN EDWARD THORNTON AND HENRY KUHN, OF ROCHESTER, NEW YORK, ASSIGNORS TO FIREPROOF FILM COMPANY, OF ROCHESTER, NEW YORK, A CORPORATION OF MAINE.

APPARATUS FOR MAKING PHOTOGRAPHIC FILMS.

1,116,762.  Specification of Letters Patent.  Patented Nov. 10, 1914.

Application filed July 28, 1910. Serial No. 574,362.

*To all whom it may concern:*

Be it known that we, JOHN EDWARD THORNTON, a subject of the King of Great Britain, and HENRY KUHN, a citizen of the United States, and both residents of Rochester, in the county of Monroe and State of New York, have invented certain new and useful Improvements in Apparatus for Making Photographic Films, of which the following is a specification.

This invention relates to apparatus for making photographic films.

Its object is to deposit upon a moving surface the material out of which the film is made in the form of a film, under conditions that will enable the film to be formed rapidly upon the moving surface, and at the same time enable it to set while it remains on the moving surface.

The invention comprises an endless belt that has a surface suitable for the manufacture of photographic films, and is, at the same time, of such length that the film spread upon it will have time to set, though the belt is moved at a higher rate of speed than has heretofore been attained by machines for making photographic films; also means for spreading the film-making material upon the belt; and also means for drying the film upon the belt when formed.

Figure 1:
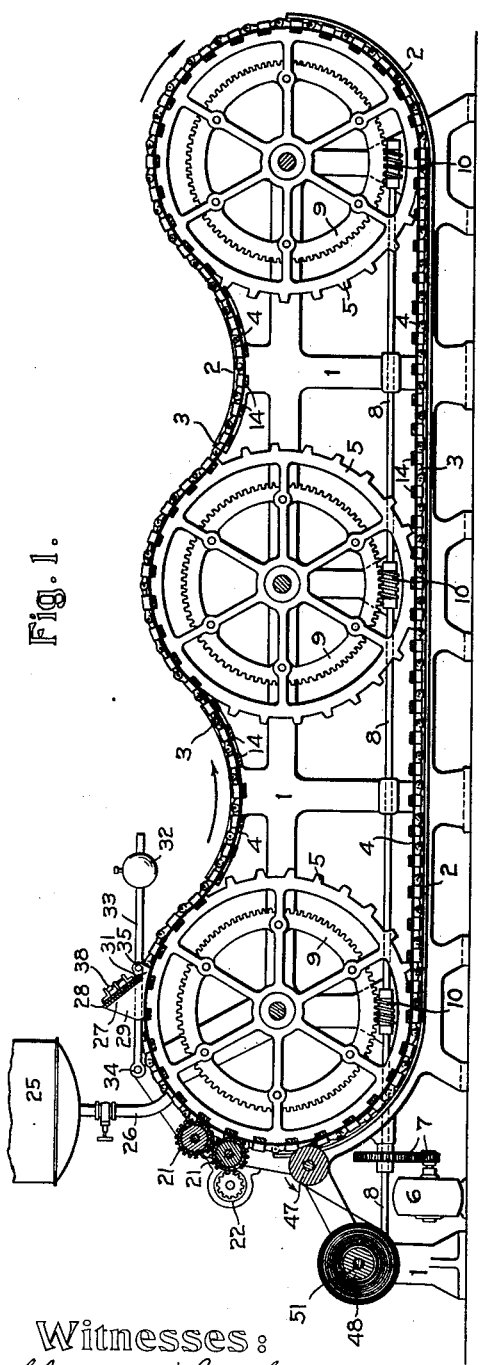
Figure 2:
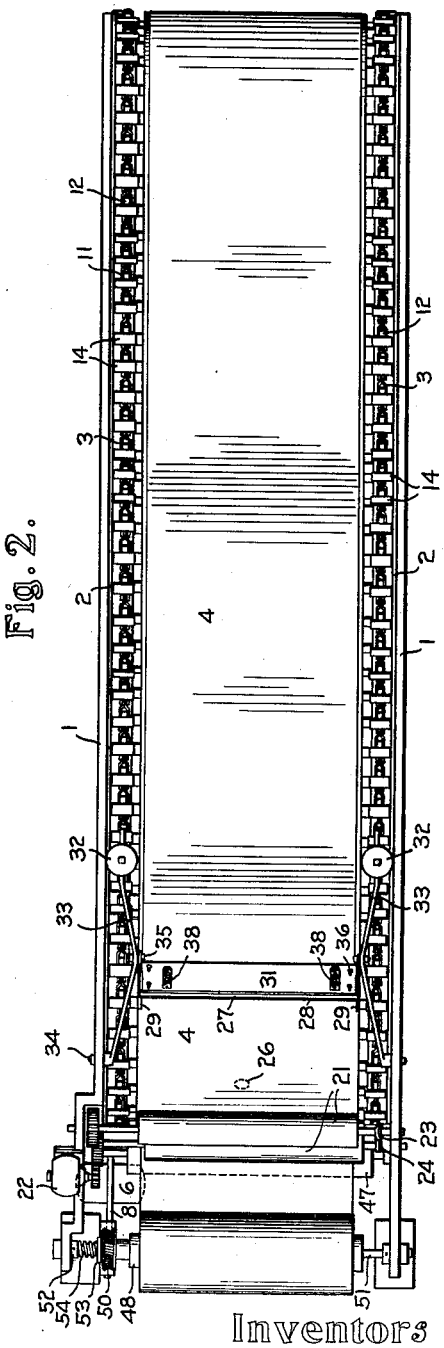
Figure 12:
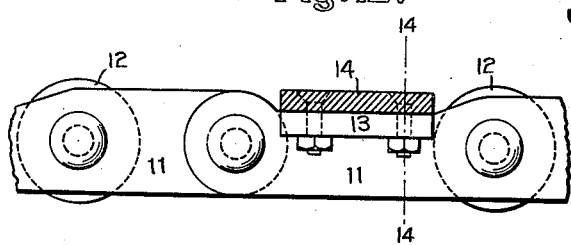
Figure 14:
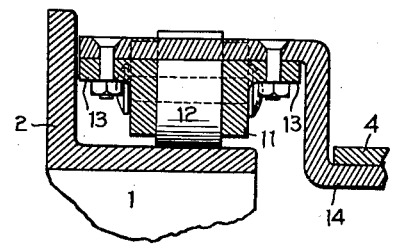
Figure 13:
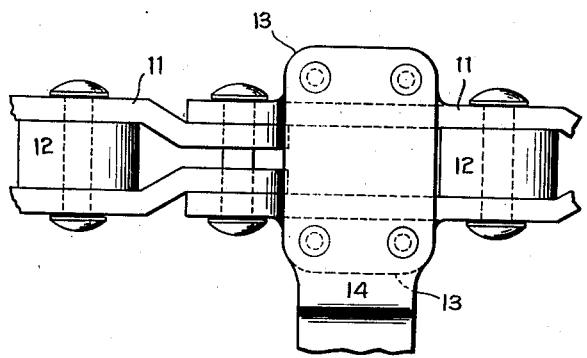

In the drawings: Figure 1 is a longitudinal sectional elevation of the complete machine; Fig. 2 is a top plan view projected from Fig. 1; Fig. 3 is a diagram that shows how the film is dried upon the machine; Fig. 4 is a cross-section of the gage for regulating the thickness of the film; Fig. 5 is a partial end elevation of the device shown in Fig. 4; Fig. 6 is a longitudinal section of the clutch for driving the roller onto which the film is wound from the belt; Figs. 7, 8, 9, 10 and 11 are cross-sections that illustrate how the sections of the belt may be joined so that it will present for the reception of the film a smooth, continuous surface; Fig. 12 is a side elevation of a part of the driving chain; Fig. 13 is a top plan of the same; Fig. 14 is a cross-section on the line 14—14 of Fig. 12; Figs. 15 and 16 are diagrammatic elevations that show two other arrangements of the carrier; and Figs. 17 and 18 are cross-sections on the lines 17—17 and 18—18 of Figs. 15 and 16, respectively.

The machine comprises a suitable frame 1, that has guides or channels 2, 2 for the reception of endless chains or cables 3, 3 (Fig. 2), an endless carrier or casting-surface 4 supported by and movable with such chains or cables, and sprockets 5, suitably driven, to move the chains and the carrier continuously in one direction. The guides 2, 2 support the belt between the sprockets 5, 5, and extend the full length of the machine, along the upper edge of the frame, thence down to and along the lower edge and thence back to the upper edge.

A motor 6 is shown for driving the machine, and this is geared at 7 to a shaft 8. The shaft extends the length of the machine, adjacent to the sprockets 5, and is supported in bearings on the frame 1 (Fig. 1). Large worm-gears 9 are fixed to the sprockets 5, and mesh with worms 10 on the driven shaft 8. The sprockets 5 are thus made to rotate in unison at a reduced speed, and the carrier is made to revolve with them.

The chains 3 (Figs. 12 to 14) are composed of links 11, that carry rollers 12 that are adapted to run in the channel 2 so that the chain moves smoothly and with little friction.

The links 11 of each chain have lugs 13 at their upper edges to which are bolted slats or bars 14 that extend transversely between the frames of the machine from one chain to the other. These slats 14 serve as supports for the plates that together present the casting-surface 4. It will be noted by reference to Fig. 14 that the casting-surface 4 is at substantially the same distance from the centers of the sprockets that the guide-ways or channels 2 are, the slats 14 being bent downward to bring the casting-surface into this position. In this way the radius of the carrier is made to coincide with the radius of the curved portions of the guide-ways, and so the casting-surface is saved from buckling or bending angularly at the points where the carrier passes over the sprockets.

The transparent, photographic films that this machine is designed to produce are made from compositions, called "dope", that contain acids which attack many substances that otherwise would be well adapted to serve as the supporting surface of the carrier. Furthermore, it is essential that this supporting surface be smooth, and free from scratches and other markings. A metal surface meets the requirements better than any other, all things considered, and it has been a problem how to utilize it for the surface of an endless carrier of the type described, when such carrier is of sufficient length both to permit the machine to be run at speed, and at the same time allow the film to set while on the belt.

Now it has been found that metal cannot be rolled in long lengths without producing superficial irregularities, and that the only way to make a long belt that is perfectly level is to use rolled plates, preferably about ten feet in length, that have been stretched in a stretching machine to remove the uneven places. We make the carrier from these plates 4 by fastening them to the transverse slats 14, and they are made to meet together in closely fitting, smooth joints, and it will be observed too that by this construction the weight of the casting surface falls entirely upon the chains 3, and that no strain is brought to bear upon the casting surface.

In Figs. 7–11, inclusive, several practical ways are shown of joining the metal sheets so that an even, continuous surface is produced.

Figure 7:
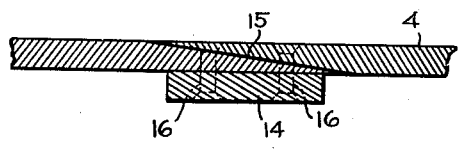
Figure 8:
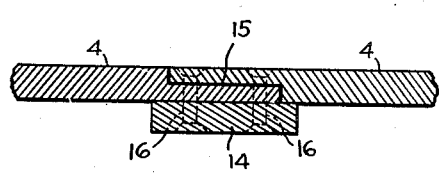
Figure 9:
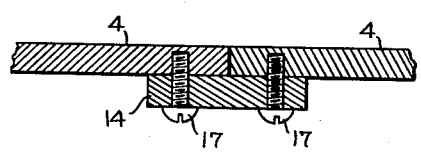

In Fig. 7 the ends of the sheets are beveled at 15, and a slat 14 is placed beneath the joint, while rivets or screws 16 extend through both the metal sheets and the slat, and are countersunk on top, flush with the casting-surface. It is desirable that the joint should be filled with solder also. The joint shown in Fig. 8 is similar, except that the edges of these plates are rabbeted instead of being beveled. In Fig. 9 the ends of the plates are shown butted square against each other, while a slat overlaps the joint. Screws 17 are tapped through the slat and into the plates, but do not pass entirely through the latter. The joints shown in Figs. 8 and 9 are also filled by solder.

Figure 10:
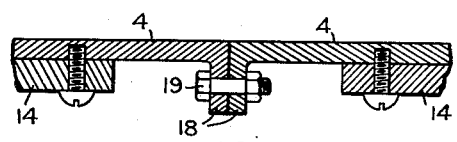
Figure 11:
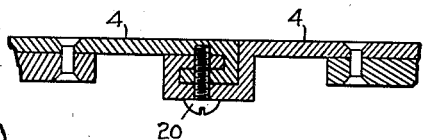

The joints shown in Figs. 10 and 11 differ from the others, in that the plates 4 are not fastened to the slats 14 at their ends, but directly to each other, while slats are screwed to the plates on each side of the joints and adjacent to them. In Fig. 10 the ends of the plates are inturned, forming flanges 18 through which bolts 19 are passed and drawn up tight. In Fig. 11 both plates are comparatively thin, and are interlocked as in the ordinary "roof-joint", screws 20 being tapped in from the bottom to within a slight distance from the top. Both of these joints are filled with solder. These metal plates when locked rigidly together in any of the ways described will not open up at the joints, and the elasticity of the metal is such that the carrier as a whole will bend into long continuous curves, that will present an unbroken and uncreased casting-surface, suitable for casting and drying the film.

It has been learned also that the casting-surface least likely to contain irregularities is one that is bent into an arc, as shown in Fig. 1, and for that reason it is advantageous to run the channels 2 up and down in a curved course across the frame, or, as specifically represented in the drawings, across that part of it along which the belt first moves after receiving the film. In order to accomplish this it is necessary to run one or more sections of the endless carrier slack, as shown between the sprockets 5, with respect to the upper half. And this slack is an advantage in itself, for when the carrier is so run the chains 3 are free from strain that otherwise might tend to stretch them and through them to bring strain upon the joints of the plates. The fact that the sprockets 5 mesh with the chains 3 for a considerable portion of the periphery of said sprockets permits the belt to be run slack in this way, and the arrangement of the channels 2 described above relieves the sprockets from much of the weight of the chain.

In order to bring the surface of the carrier to a high polish, a buffing device is provided, which may be used when desired. In the drawings, a device is shown that comprises two felt-covered rollers 21, 21 geared together, so as to revolve in opposite directions (Figs. 1 and 2), and driven by a motor 22. The motor runs at a high speed, and the rollers 21 rub against the carrier and polish it. The rollers may be moved back and forth laterally to prevent the formation of scratches and streaks on the casting-surface of the carrier, and this movement is accomplished by a cam 23 on the roller-shaft, which engages a groove 24 on the frame 1 (Fig. 2).

The composition or dope from which the film is made is contained in a suitable tank 25 located above the machine. This flows through a pipe 26 onto the center of the carrier 4 at a point slightly below the highest point of the first sprocket 5.

Inasmuch as the carrier travels continuously in the direction represented by the arrows in the drawing, the fluid, which is of a thick, viscous nature, cannot run back upon the buffing rollers 21, but is carried upward and forward until it strikes a gage or scraper 27 that extends the full width of the carrier.

The gage 27 is illustrated in Figs. 4 and 5, and comprises an inclined plate 28, with rearwardly-extending end pieces 29 that rest on the carrier at 30, and also a plate 31 that is slidably mounted on the plate 28. The edges 30 of the end pieces 29 are pressed tightly upon the carrier by adjustable weights 32 (Fig. 1) that are carried at the ends of levers 33. Said levers are pivoted to the frame 1 at 34 (Fig. 1) and are connected with the ends 29 at 35.

The plate 31 is guided on the plate 28 by screws 36 that project through slots 37 (Fig. 5) and is moved up or down by means of micrometer screws 38, the latter being journaled in brackets 39 on the plate 31, and fixed in lugs 40 on the plate 28 that project through slots 41.

The opening left between the sharp lower edge of the gage 31 and the casting-surface of the carrier determines the thickness of the film that will be drawn out through this opening. Since only a small amount of dope can pass through the gaged opening at one time, it is caused to bank up and spread out back of the plate 28 and between the end pieces 29, the latter preventing it from running over the edges of the carrier. The pressure of this accumulation, of course, tends to lift the gage as the dope is drawn through the opening, its viscous nature causing it to adhere to the surface of the carrier, but the weights 32 are adjusted to keep the end pieces 29 continually in close contact with the casting-surface of the carrier, and the micrometers provide means for keeping always the same space between the gage 31 and the carrier, and so insuring a film of uniform thickness. It should be noted too that when this dope, which, as stated, is viscous in character, is used on a traveling carrier in connection with an inclined plate like 28, and the carrier moves forward carrying the dope against the gage 31, it wedges the dope into the angle between the casting-surface of the carrier and the plate 28, and squeezes it out under great pressure through the opening between the gage 31 and the casting-surface of the carrier in a thin, smooth, even layer. This action makes it possible to spread dope which is extremely thick, such as could not possibly be used by the V-troughs heretofore used for forming film. Since the dope adheres to the casting-surface to some extent and that aids the carrier in squeezing the dope out beneath the gage, the inclination of the plate 28 with respect to the moving carrier is an important factor in the formation of the film when the dope is of a viscous nature.

Immediately forward of the gage 27 and rear sprocket 5 (Fig. 3), from the standpoint of its direction of rotation, the carrier passes through a partition 42 and enters a room 43. After passing over the sprocket 5 at the farther end of the room, the carrier returns through the partition 42 to said front sprocket. Disposed throughout the length of the room 43 are steam or hot water coils 44. The first coils have less radiating surface than those farther down the room. An air duct 45 leading from a blower (not shown) fills the room with fresh air, which rises in temperature gradually as it approaches the outlet air duct 46 at the farther end of the room, because of the said arrangement of the heating coils, and accordingly the film dries gradually, evenly and thoroughly. The duct 46 is usually connected to an exhauster (not shown), which draws the air through a condensing apparatus (not shown), in which the volatile fumes are condensed and recovered for furthur use.

The film is practically dry and "set" by the time it reaches the end of the drying room, but will be more thoroughly seasoned if allowed to pass back to the front sprocket on the carrier, to which it sufficiently adheres to make this possible.

To remove the film from the carrier in an unbroken strip, its forward end is peeled from the carrier by a knife, then passed over an idler-roll 47 lying close to the carrier, and fastened to a winding roller 48. The latter roller is driven from the shaft 8 by means which tend to rotate it at a speed greater than the speed of the carrier, so that after the roller is started, the film will be stripped off the carrier by the tension between said roller and the carrier. A slipping clutch is provided on the roller 48 so that the tension may always be maintained at the required degree. This clutch is shown in section in Fig. 6. The worm 49 on the shaft 8 drives continuously the worm-wheel 50 that is loose on the roller shaft 51. A collar 52 is fixed on said shaft, and a sleeve 53 is also splined to it, while a spring 54 forces said sleeve against the side of the worm-wheel 50. If the tension of the film is slight, the friction of the sleeve 53 on the worm-wheel 50 permits the latter to rotate the roller 48, but as soon as the tension overcomes the spring pressure, the sleeve slips and permits the worm-wheel to turn without increasing the tension.

From this description of the machine it is obvious that it affords means for employing a long continuous belt or carrier, which provides a correspondingly long time for the film to dry, and which also makes it possible to employ lower temperatures than otherwise, so that the product of the machine is more uniformly good, and less liable to be distorted than when made on other machines, and all this is accomplished while the speed of the machine is greater than other machines have been able to attain.

We have explained above the advantages derived from running the carrier in a curved path, as illustrated in Fig. 1. Figs. 15 to 18, inclusive, illustrate other ways in which the carrier may be arranged so that it will run slack and give the advantages mentioned. Fig. 15 shows the upper section of the carrier 4 horizontal, and supported laterally by the rails 2ª, 2ª, while the return section is supported midway between the end sprockets 5, 5 by flanged idler-pulleys 4ª, 4ª (Fig. 17). Fig. 16 shows practically the same arrangement, except that here the return section of the belt is entirely unsupported, hanging in its natural curve from the sprockets 5, 5. Fig. 18 illustrates a means for supporting the upper section of the belt when that section is the one that is horizontal. Although Fig. 18 is a cross-section on Fig. 16, it is equally applicable to the construction shown in Fig. 15. This support for the upper horizontal section just referred to consists of longitudinal supports for the edges of the belt 2ª, 2ª, before mentioned and intermediate parallel rails 2ᵇ, 2ᵇ.

We claim:—

1. In a film-making machine, the combination with an endless belt affording a casting-surface, of a frame movable to and from said surface and weighted to rest thereon, that intercepts the dope carried by said belt and that has a gage for regulating the thickness of the film; substantially as shown and described.

2. In a film-making machine, the combination with an endless belt affording a casting-surface, of a plate that extends upwardly from said casting-surface and backwardly in the direction opposite that of the movement of said belt to intercept the dope on its casting-surface, that is movable toward and from said casting-surface, that has side pieces adapted to rest upon the latter, and that is weighted to rest thereon; and a gage supported by said plate for regulating the thickness of the film; substantially as shown and described.

3. In a film-making machine, the combination with an endless belt affording a casting-surface, of a plate that extends upwardly from said casting-surface and backwardly in the direction opposite that of the movement of said belt to intercept the dope on its casting-surface, that is movable toward and from said casting-surface, that has side pieces adapted to rest upon the latter, and that is weighted to rest thereon; a gage supported by said plate for regulating the thickness of the film; and means for adjusting the weight whereby the side pieces of the plate are held upon the surface of said belt; substantially as shown and described.

4. In a film-making machine, the combination with an endless belt affording a casting-surface, of a plate that extends upwardly from said casting-surface and backwardly in the direction opposite that of the movement of said belt to intercept the dope on its casting-surface, that is movable toward and from said casting-surface, that has side pieces adapted to rest upon the latter, and that is weighted so that said side pieces rest thereon; a gage supported by said plate for regulating the thickness of the film; and means for adjusting the distance between said gage and the casting-surface of said belt; substantially as shown and described.

5. In film-making apparatus, the combination with a film-drying compartment, of dope-depositing and film-forming devices, adjacently located, and an endless, horizontally-extending belt that affords a film-casting surface that is adapted to receive dope from said devices and which enters said compartment after receiving the film, and returns the film after it has been dried to stripping means located outside of said compartment; substantially as shown and described.

6. In film-making apparatus, the combination with dope-depositing and film-forming devices, of a horizontally extending, film-drying compartment, adapted to receive a current of air at the end nearest the film-forming devices and to discharge it at the farther end; means for increasingly heating the air in its passage through said compartment; and a horizontally-supported, endless belt, that affords a film-casting surface that is adapted to receive dope from said devices, and then to enter said compartment with it; substantially as shown and described.

7. In a film-making machine, the combination with a suitable frame, of dope-depositing and film-forming devices; a flexible, endless belt, having a metal casting-surface comprised of thin, transversely-extending plates, suitably supported and guided at their ends and rigidly secured together along their sides to form a unitary structure; substantially as shown and described.

8. In a film-making machine, the combination with a suitable frame, of dope-depositing and film-forming devices; a flexible, endless belt, having a metal casting-surface, said belt comprising endless parallel supports and thin transverse plates, rigidly secured together along their sides to form a unitary structure, and connected at their ends with said endless supports; and means for supporting said belt rotatively and for operating it; substantially as shown and described.

9. In a film-making machine, the combination with dope-depositing and film-forming devices, of a flexible, endless belt having a metal casting-surface, said belt comprising parallel endless supports 3, 3, transverse slats 14 that extend between and are connected with said supports, and plates 4 that are connected to said slats and meet together in closely fitting joints; a suitable supporting frame; and means thereon for rotatively supporting said belt; substantially as shown and described.

10. In a film-making machine, the combination with dope-depositing and film-forming devices, of a flexible, endless belt having a metal casting-surface, said belt comprising parallel, endless supports, and thin metal plates that extend transversely between said supports and are connected together along their sides to form a unitary structure; a suitable frame, having oppositely-placed, parallel channels that are adapted to receive said supports; and means on said frame for rotatively supporting said belt; substantially as shown and described.

11. In a film-making machine, the combination with dope-depositing and film-forming devices, of a suitable frame having oppositely-placed endless channels to serve as side supports for an endless belt; a flexible, endless belt that is adapted to travel in said channels, respectively; and means on said frame for rotatively supporting said belt; substantially as shown and described.

12. In a film-making machine, the combination with dope-depositing and film-forming devices, of a flexible, endless belt, having self-supporting devices along its sides; and a frame having oppositely-placed endless channels adapted to receive said supporting devices; substantially as shown and described.

13. In a film-making machine, the combination, with dope-depositing and film-forming devices, of a flexible, endless, resilient belt; a series of sprocket-wheels upon which the belt is mounted with upper and lower stretches of which one, at least, consists of a series of deep catenary curves; and gearing connecting and actuating the sprocket-wheels, whereby they are driven positively at such relative speeds as to maintain the belt in said position.

14. In a film-making machine, the combination, with dope-depositing and film-forming devices, of a flexible, endless, resilient belt extended with a stretch upon the upper surface of which the dope is directly deposited and the film formed by the depositing and film-forming devices; and means coöperating directly and positively with the belt for supporting said stretch and moving it, away from said devices, through a succession of deep reverse longitudinal curves, whereby the belt is prevented from bending transversely during such movement.

JOHN EDWARD THORNTON.
HENRY KUHN.

Witnesses:
H. DRUKKER,
D. GURNEE.